United States Patent
Nogai et al.

(10) Patent No.: US 9,676,958 B2
(45) Date of Patent: Jun. 13, 2017

(54) POLYMER DISPERSIONS AND THEIR USE IN PIGMENTED COATING COMPOSITIONS

(75) Inventors: Stefan Nogai, Heidelberg (DE); Alistair McLennan, Koenigstein (DE)

(73) Assignee: CELANESE SALES GERMANY GMBH, Sulzbach (DE)

(*) Notice: Subject to any disclaimer, the term of this patent is extended or adjusted under 35 U.S.C. 154(b) by 179 days.

(21) Appl. No.: 14/364,407

(22) PCT Filed: Dec. 16, 2011

(86) PCT No.: PCT/IB2011/003243
§ 371 (c)(1),
(2), (4) Date: Jun. 11, 2014

(87) PCT Pub. No.: WO2013/088188
PCT Pub. Date: Jun. 20, 2013

(65) Prior Publication Data
US 2015/0247054 A1    Sep. 3, 2015

(51) Int. Cl.
| | |
|---|---|
| C09D 133/14 | (2006.01) |
| C09D 123/08 | (2006.01) |
| C08K 5/05 | (2006.01) |
| C08K 5/101 | (2006.01) |
| C08K 5/41 | (2006.01) |
| C08K 5/42 | (2006.01) |
| C09D 133/08 | (2006.01) |
| C09D 133/10 | (2006.01) |

(52) U.S. Cl.
CPC ............. *C09D 133/14* (2013.01); *C08K 5/05* (2013.01); *C08K 5/101* (2013.01); *C08K 5/41* (2013.01); *C08K 5/42* (2013.01); *C09D 123/0869* (2013.01); *C09D 133/08* (2013.01); *C09D 133/10* (2013.01); *C08L 2312/00* (2013.01)

(58) Field of Classification Search
CPC .................................................. C09D 133/14
See application file for complete search history.

(56) References Cited

U.S. PATENT DOCUMENTS

| | | | |
|---|---|---|---|
| 4,108,819 A | 8/1978 | Oyamada et al. | |
| 4,267,090 A | 5/1981 | Heimberg et al. | |
| 5,143,966 A | 9/1992 | Lee et al. | |
| 5,180,772 A | 1/1993 | Mao et al. | |
| 6,359,076 B1 | 3/2002 | Lunsford et al. | |
| 6,624,243 B2 | 9/2003 | Stark et al. | |
| 6,673,862 B1 | 1/2004 | Smith | |
| 7,064,091 B2 | 6/2006 | Goldstein et al. | |
| 7,789,959 B2 | 9/2010 | Fichtner et al. | |
| 2003/0144405 A1* | 7/2003 | Lewin | C09J 125/14 524/493 |
| 2005/0287336 A1 | 12/2005 | Lunsford et al. | |
| 2007/0129484 A1* | 6/2007 | Horio | C08L 51/06 524/505 |
| 2008/0044565 A1 | 2/2008 | Mueller et al. | |
| 2010/0255301 A1* | 10/2010 | Moller | C08F 218/08 428/355 AC |

OTHER PUBLICATIONS

International Search Report and Written Opinion issued in a corresponding PCT/IB2011/003243 on May 22, 2012.
Tsuchihara, Toyoji et al: "Preparation and application of adhesive. IV. Preparation of aqueous ethylene/vinyl acetate copolymer emulsion for flocky adhesive", Database CA [Online] Chemical Abstracts Service, Columbus, Ohio, US.

* cited by examiner

*Primary Examiner* — Megan McCulley
(74) *Attorney, Agent, or Firm* — Roberts Mlotkowski Safran Cole & Calderon P.C.

(57) ABSTRACT

A copolymer dispersion is described comprising a copolymer derived from a monomer mixture comprising: (a) 88.5 to 94% by weight of at least one vinyl ester of a saturated carboxylic acid; (b) 5 to 10.5% by weight of ethylene; (c) 0.5 to 5% by weight of at least one ethylenically unsaturated acid and/or an anhydride thereof and/or a salt thereof; and (d) 0.5 to 5% by weight of at least one ethylenically unsaturated monomer having at least one crosslinkable functional unit. The weight ratio of vinylester units to ethylene units in the copolymer is between 89:11 and 94:6 and the dispersion is stabilized with at least 1% by weight of an emulsifier, wherein the amounts of monomers and emulsifier refer to the total amount of monomers in the copolymer.

18 Claims, No Drawings

POLYMER DISPERSIONS AND THEIR USE IN PIGMENTED COATING COMPOSITIONS

CROSS-REFERENCE TO RELATED APPLICATIONS

The present application is a U.S. National Phase of PCT/IB2011/003243 filed on Dec. 16, 2011. The disclosure of the PCT Application is hereby incorporated by reference into the present application.

FIELD

The present invention relates to polymer dispersions and their use as binders in pigmented coating compositions, such as plasters, renders and paints.

BACKGROUND

The use of aqueous polymer dispersions as binders in pigmented coating compositions is well known. For example, polyvinyl ester dispersions, including dispersions of polyvinyl acetate-ethylene-copolymers (hereinafter "VAE-copolymers") are known binders for coating compositions. VAE-copolymers are prepared predominantly via emulsion polymerization and are used as aqueous VAE-copolymer dispersions. It is known that the glass transition temperature of these VAE-copolymers can be adjusted by varying the vinyl acetate to ethylene ratio of the copolymer, with higher amounts of ethylene units in the VAE-copolymer generally resulting in a decrease in glass transition temperature. In applications where non-tackyness is important, for example in paints or in renders or plasters, glass transition temperatures above 0° C. are strived for. VAE-copolymers in emulsions for paint and plaster or render applications in general possess ethylene contents of between 12 to 16% by weight. On the other hand, VAE-copolymers with high glass transition temperatures are often inferior as binders for coating compositions since these copolymers result in coating compositions with high minimum film forming temperatures (hereinafter "MFT"). A low MFT is essential in many coating applications. While the MFT can be lowered by adding cosolvents (coalsecing agents) to the formulation, the amount of such agents often should be kept low in view of ecological constraints. Therefore, development of a VAE-copolymer emulsion adapted ideally to a selected use is often a compromise between several variables.

VAE-copolymer emulsions have been used extensively for coating applications of different substrates, for example for carpet applications (see e.g. U.S. Pat. No. 6,359,076). This document discloses a crosslinkable carpet backing coating composition comprising an aqueous VAE-copolymer dispersion derived from 4 to 25% by weight of ethylene, 67 to 95% by weight of vinyl acetate and 0.1 to 8% by weight of an ethylenically unsaturated hydroxyfunctional monomer in combination with a selected crosslinking agent. No details about ethylene content and glass transition temperature of the VAE-dispersions used in the examples are disclosed.

U.S. Published Patent Application No. 2005/0287336 discloses VAE-copolymer emulsions adapted for carpet coating. The VAE-copolymer used in this application is comparatively soft and has a glass transition temperature between 0° C. and −40° C. These copolymers therefore have an ethylene content which is comparatively high, namely between 20 and 40 wt % of the total monomer content.

U.S. Pat. No. 7,064,091 discloses of a self-crosslinking polymer in a binder for non-wovens in order to improve the wet-strength of a wipe. As a binder, among others, VAE-copolymers are disclosed. These are derived from 50-95% by weight of a vinylester, by 5-30% by weight of ethylene as well as optionally by up to 12% by weight of a cross-linking monomer. These copolymer dispersions are comparatively soft, as the ethylene content of the specific copolymers in the examples is above 12% by weight.

U.S. Published Patent Application No. 2008/0044565 discloses a process for application of an adhesive comprising aqueous vinyl ester dispersion adhesive via a nozzle. Preferably vinylester-ethylene-copolymers are used, which are derived from 40-95% by weight of vinylesters, from up to 45% by weight of ethylene and from up to 60% by weight of other comonomers copolymerizable therewith.

U.S. Pat. No. 7,789,959 discloses a preservative-free coating agent comprising a selected vinylester-copolymer and a strong base for adjusting a pH-value above 10 in the dispersion. Copolymers derived from vinylacetate, ethylene and vinylesters of Versatic acids are disclosed. The ethylene content of these copolymers is typically between 10 and 20% by weight.

U.S. Pat. No. 5,143,966 discloses VAE-copolymer emulsions with improved wet adhesion, The copolymers are derived from 70-98% by weight of vinylacetate and 2-30% by weight of ethylene as well as from optionally up to 10% by weight of further monomers copolymerizable therewith. As stabilization system, a ternary mixture of polyvinylalcohols is used. This results in dispersions with relatively coarse particles with an average particle diameter of around 1 µm ($d_w$).

U.S. Pat. No. 6,673,862 discloses a process for the preparation of VAE-copolymer emulsions stabilized with a mixture of polyethylene glycol and polyvinyl alcohol. The copolymers are derived from 50-95% by weight of vinylacetate and from 5-50% by weight of ethylene as well as optionally from up to 10% by weight of additional monomers copolymerizable therewith. In view of the stabilization system the average particle diameters of these dispersions are comparatively coarse and well above 500 nm ($d_w$).

U.S. Pat. No. 4,267,090 discloses a process for the preparation of VAE-copolymer emulsions derived from 60-95% by weight of vinylacetate, from 5-40% by weight of ethylene and optionally from small amounts of additional monomers copolymerizable therewith. The polymerization reaction is carried out in the presence of a stabilization system consisting of an emulsifier and a protective colloid. Vinyl acetate monomer and emulsifier are added incrementally during the polymerization.

U.S. Pat. No. 4,108,819 discloses an aqueous VAE-copolymer dispersion comprising an epoxy component. The epoxy content is between 0.5 and 60% by weight of the total amount of monomers used during copolymerization. The content of vinyl acetate is between 60 and 95% by weight and the content of ethylene is between 5 and 40% by weight of the total amount of monomer. The emulsion polymerization can be carried out in the presence of emulsifiers and/or of protective colloids.

U.S. Pat. No. 5,180,772 discloses a dispersion comprising a VAE-copolymer with 60-94% by weight of vinylacetate units, 5-30% by weight of ethylene units and with 1-10% by weight of crosslinking units and comprising 1-45% by weight of tetramethylol glycoluril.

U.S. Pat. No. 6,624,243 discloses emulsions comprising copolymers, such as VAE-copolymer emulsions, functionalized with hydrolysable silane units and with epoxy-group containing units. These functionalized copolymers can be used in different paint formulations, e.g. in silicate-rich or in carbonate-rich formulations, and are said to provide an excellent wet-scrub resistance in both types of formulations. In the examples of this document, VAE-copolymers are disclosed with a content of ethylene units between 11 and 20% by weight.

We have now found that selected VAE-copolymer emulsions can provide coating compositions which are characterized by a balanced set of properties, such as low MFT combined with high scrub resistance and excellent blocking resistance of the resulting coatings. This combination of properties is comparable to those of commercially available acrylic paint formulations.

SUMMARY

Accordingly, the invention resides in one aspect in a copolymer dispersion comprising a copolymer which is derived from a monomer mixture comprising:
a) 88.5 to 94% by weight of at least one vinyl ester of a saturated carboxylic acid, especially vinyl acetate;
b) 5 to 10.5% by weight, such as 7 to 10% by weight, of ethylene;
c) 0.5 to 5% by weight of at least one ethylenically unsaturated acid and/or an anhydride thereof and/or a salt thereof; and
d) 0.5 to 5% by weight of at least one ethylenically unsaturated monomer having at least one crosslinkable functional unit, and wherein the weight ratio of vinylester units to ethylene units in the copolymer is between 89:11 and 94:6, referring to the total amount of these units, the dispersion is stabilized with at least 1% by weight of an emulsifier and optionally of up to 3% by weight of a protective colloid, and the amounts of monomers and stabilizers refer to the total amount of monomers in the copolymer.

Conveniently, the ethylenically unsaturated acid is selected from the group consisting of an ethylenically unsaturated sulfonic acid, an ethylenically unsaturated monocarboxylic acid, a carboxy-group containing ester of an ethylenically unsaturated monocarboxylic acid, or a monoester of an ethylenically unsaturated dicarboxylic acid or a combination of two or more thereof. Typically, the ethylenically unsaturated acid is selected from the group consisting of vinyl sulfonic acid, acrylic acid, methacrylic acid, 2-carboxyalkylacrylate, 2-carboxyalkylmethacrylate, itaconic acid, monoalkylester of maleic acid or a combination of two or more thereof.

Conveniently, wherein the ethylenically unsaturated monomer having at least one crosslinkable functional unit comprises an ethylenically unsaturated monomer having at least one amide-, epoxy-, hydroxy-, N-methylol-, silane- or carbonyl-group. Typically, the ethylenically unsaturated monomer having an epoxy group comprises glycidyl acrylate or glycidyl methacrylate.

Optionally, the monomer mixture further comprises up to 10% by weight of units derived from at least one ethylenically unsaturated monomer (e) which differs from the monomers of groups a) to d).

In one embodiment, the vinyl ester-ethylene-copolymer has a glass transition temperature between +20 and +30° C.

In a further aspect, the invention resides in a coating composition comprising at least one pigment and binder composition comprising an aqueous vinylester-ethylene-copolymer dispersion as described herein.

DETAILED DESCRIPTION

Described herein is an aqueous copolymer dispersion and its use as a binder in pigmented coating compositions, such as plasters, renders and paints. The present aqueous copolymer dispersion comprises a copolymer formed from a monomer mixture comprising (a) at least one vinyl ester of a saturated carboxylic acid, (b) ethylene, (c) at least one ethylenically unsaturated acid and/or an anhydride or a salt thereof, and (d) an ethylenically unsaturated monomer having at least one crosslinkable functional unit.

At least one vinyl ester of a saturated carboxylic acid (a) is present in an amount between 88.5 and 94% by weight of the overall monomer mixture and is generally a vinyl ester of a monocarboxylic acid having one to eighteen carbon atoms. Examples of such monomers are vinyl formate, vinyl acetate, vinyl propionate, vinyl isobutyrate, vinyl valerate, vinyl pivalate, vinyl 2-ethylhexanoate, vinyl decanoate, isopropenyl acetate, vinyl esters of saturated branched monocarboxylic acids having 5 to 15 carbon atoms in the acid radical, especially vinyl esters of the Versatic® acids, vinyl esters of relatively long-chain saturated or unsaturated fatty acids such as, for example, vinyl laurate, vinyl stearate, and also vinyl esters of benzoic acid and of substituted derivatives of benzoic acid, such as vinyl p-tert-butylbenzoate. Of these, however, vinyl acetate as a principal monomer is particularly preferred.

Ethylene is present in an amount between 5 and 10.5% by weight, such as between 7 and 10% by weight, of the overall monomer mixture, typically such that the weight ratio of vinyl ester units to ethylene units in the copolymer is between 89:11 and 94:6, preferably between 90:10 and 92:8.

In addition to the vinyl ester and ethylene, the monomer mixture comprises between 0.5 and 5% by weight, preferably between 1 and 4% by weight, of each of at least one ethylenically unsaturated acid and/or an anhydride or a salt thereof (c) and at least one ethylenically unsaturated monomer having at least one crosslinkable functional unit (d).

Examples of suitable ethylenically unsaturated acids (c) are α,β-monoethylenically unsaturated monocarboxylic and dicarboxylic acids having 3 to 10 carbon atoms, ethylenically unsaturated sulfonic acids, ethylenically unsaturated phosphonic acids, as well as their water-soluble salts, such as their sodium salts, or their anhydrides. Preferred monomers from this group are vinylsulfonic acid and its alkali metal salts, acrylamidopropanesulfonic acid and its alkali metal salts, ethylenically unsaturated $C_3$ to $C_8$ carboxylic acids and $C_4$ to $C_8$ dicarboxylic acids, such as maleic acid, fumaric acid, itaconic acid, crotonic acid, vinylacetic acid, acrylamidoglycolic acid, and, in particular, acrylic acid and methacrylic acid and the salts or anhydrides of these carboxylic acids.

Examples of suitable ethylenically unsaturated monomers having at least one crosslinkable functional unit (d) are ethylenically unsaturated monomers containing N-alkylol groups and/or derivatives thereof, ethylenically unsaturated monomers containing hydrolyzable silane groups, ethylenically unsaturated monomers containing epoxy groups, monomers containing two or more vinyl radicals, monomers containing two or more vinylidene radicals, monomers containing two or more alkenyl radicals, or ethylenically unsaturated hydroxy-functional monomers.

Examples of ethylenically unsaturated monomers containing N-alkylol groups, especially N-methylol groups, are N-alkylol derivatives of amides of ethylenically unsaturated monocarboxylic or dicarboxylic acids, preferably of acrylic acid or of methacrylic acid. Preferred examples of such monomers are N-methylolacrylamide, N-methylolmethacrylamide, N-methylolallylcarbamate, N-ethylolacrylamide, N-propylolacrylamide, N-butylolacrylamide or dialkoxyhydroxyethylacrylamide. In addition it is also possible to use derivatives of N-methylol compounds, such as their esters, ethers or Mannich bases. N-methylol esters, N-methylolalkyl ethers or Mannich bases of N-methylolacrylamide or of N-methylolmethacrylamide or of N-methylolallylcarbamate, or the alkyl ethers of dialkoxyhydroxyethylacrylamide.

Examples of ethylenically unsaturated monomers containing hydrolyzable silane groups are ethylenically unsaturated monomers which have at least one alkoxysilyl group. Preferred are organosilanes of the formula:

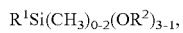

in which $R^1$ has the meaning $CH_2=CR^3-(CH_2)_{0-1}$ or $CH_2=CR^3-CO_2-(CH_2)_{1-3}$; $R^2$ is a straight-chain or branched chain, optionally substituted, alkyl radical having 1 to 12 carbon atoms, which may be optionally interrupted by an ether group, and $R^3$ is hydrogen or methyl.

Other preferred organosilanes have the formulae:

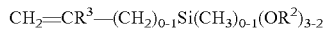

and

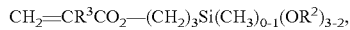

in which $R^{12}$ is a straight-chain or branched chain, optionally substituted, alkyl radical having 1 to 12 carbon atoms and $R^3$ is hydrogen or methyl.

Still other preferred organosilanes have the formulae:

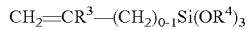

and

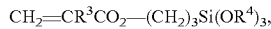

in which $R^4$ is a branched or straight-chain alkyl radical having 1 to 4 carbon atoms and $R^3$ is hydrogen or methyl.

Particularly preferred organoslianes are vinylmethyldimethoxysilane, vinylmethyl-diethoxysliane, vinylmethyldi-n-propoxysilane, vinylmethyldiisopropoxysilane, vinylmethyldi-n-butoxysilane, vinylmethyldi-sec-butoxysilane, vinylmethyldi-tert-butoxysilane, vinylmethyldi(2-methoxyisopropoxy)silane, vinylmethyldioctyloxysilane, γ-(meth)acryloylpropyltris(2-methoxyethoxy)silane, γ-(meth)acryloyloxypropyltris-methoxysilane, γ-(meth)acryloyloxypropyltrisethoxysilane, γ-(meth)acryloyloxypropyl-tris-n-propoxy-silane, γ-(meth)acryloyloxypmpyltrisisopropoxysilane, γ-(meth)acryloyloxypropyltrisbutoxysilane, γ-acryloyloxypropyltris(2-methoxyethoxy)silane, γ-acryloyloxypropyltris-methoxysilane, γ-acryloyloxypropyltrisethoxysilane, γ-acryloyloxypropyltris-n-propoxysilane, γ-acryloyloxypropyltrisisopropoxysilane, γ-acryloyloxypropyltris-butoxysilane and vinyltris(2-methoxyethoxy)silane, vinyltrismethoxysilane, vinyltrisethoxysilane, vinyltris-n-propoxysilane, vinyltrisisopropoxysilane and vinyltrisbutoxysilane. Said silane compounds can optionally also be used in the form of their (partial) hydrolysis products.

Examples of ethylenically unsaturated monomers containing epoxy groups are esters of ethylenically unsaturated monocarboxylic acids with 1,2-epoxyalkanols, preferably with 1,2-epoxypropanol. Very preferred are esters of acrylic acid and of methacrylic acid. Specific examples of preferred monomers of this type are glycidyl methacrylate and glycidyl acrylate.

Examples of monomers containing two or more vinyl radicals, are monomers containing two or more vinylidene radicals, and monomers containing two or more alkenyl radicals. Particularly advantageous in this context are the diesters of dihydric alcohols with α,β-monoethylenically unsaturated monocarboxylic acids, among which acrylic and methacrylic acid are preferred; the diesters of dibasic carboxylic acids with ethylenically unsaturated alcohols; other hydrocarbons having two ethylenically unsaturated groups; or the diamides of difunctional amines with α,β-monoethylenically unsaturated monocarboxylic acids.

Examples of monomers of this kind containing two non-conjugated ethylenically unsaturated double bonds are alkylene glycol diacrylates and dimethacrylates, such as ethylene glycol diacrylate, 1,2-propylene glycoldiacrylate, 1,3-propylene glycol diacrylate, 1,3-butylene glycol diacrylate, 1,4-butylene glycol diacrylates or dimethylacrylates and ethylene glycol diacrylates or dimethacrylates, 1,2-propylene glycol dimethacrylate, 1,3-propylene glycol dimethacrylate, 1,3-butylene glycol dimethacrylate, 1,4-butylene glycol dimethacrylates, hexanediol diacrylate, pentaerythritol diacrylate, pentaerythritol diacrylate, and also divinylbenzene, vinyl methacrylate, vinyl acrylate, vinyl crotonate, allyl methacrylate, allyl acrylate, diallyl maleate, diallyl fumarate, diallyl phthalate, cyclopentadienyl acrylate, divinyl adipate or methylenebisacrylamide.

It is, however, also possible to use monomers having more than two double bonds, examples being tetraallyloxyethane, trimethylolpropane triacrylate, and triallyl cyanurate.

Examples of ethylenically unsaturated hydroxy-functional monomers are $C_1$-$C_9$ hydroxyalkyl esters of ethylenically unsaturated monocarboxylic acids, such as acrylic acid or of methacrylic acid. Specific examples thereof include n-hydroxyethyl, n-hydroxypropyl or n-hydroxybutyl acrylate and methacrylate, and also their adducts with ethylene oxide or propylene oxide.

In addition to the monomers (a) to (d), the copolymer of the present aqueous dispersion may contain up to 10% by weight of at least one ethylenically unsaturated monomer e) differing from and copolymerizable with the monomers a) to d).

Examples of suitable monomers e) are aliphatic, monoolefinically or diolefinically unsaturated, optionally halogen-substituted, hydrocarbons other than ethylene. Specific examples thereof are propene, 1-butene, 2-butene, isobutene, conjugated $C_4$-$C_8$ dienes, such as 1,3-butadiene, isoprene, chloroprene, vinyl chloride, vinylidene chloride, vinyl fluoride and vinylidene fluoride.

A further group of suitable comonomers e) comprises esters of α,β-ethylenically unsaturated monocarboxylic or dicarboxylic acids, especially esters of α,β-ethylenically unsaturated $C_3$-$C_8$ monocarboxylic or dicarboxylic acids with preferably $C_1$-$C_{18}$ alkanols and especially $C_5$-$C_8$ alkanols or $C_5$-$C_8$ cycloalkanols. The esters of the dicarboxylic acids may be monoesters or, preferably, diesters. Suitable $C_1$-$C_8$ alkanols are, for example, methanol, ethanol, n-propanol, isopropanol, 1-butanol, 2-butanol, isobutanol, tert-butanol, n-hexanol, and 2-ethylhexanol. Suitable cycloalkanols are, for example, cyclopentanol or cyclohexanol. Examples are esters of acrylic acid, of methacrylic acid, of crotonic acid, of maleic acid, of itaconic acid, citraconic acid or of fumaric acid, such as methyl (meth)acrylate, ethyl (meth)acrylate, isopropyl (meth)acrylate, n-butyl (meth)

acrylate, isobutyl (meth)acrylate, 1-hexyl (meth)acrylate, tert-butyl (meth)acrylate, 2-ethylhexyl (meth)acrylate, di-n-methyl maleate or fumarate, di-n-ethyl maleate or fumarate, di-n-propyl maleate or fumarate, di-n-butyl maleate or fumarate, diisobutyl maleate or fumarate, di-n-pentyl maleate or fumarate, di-n-hexyl maleate or fumarate, dicyclohexyl maleate or fumarate, di-n-heptyl maleate or fumarate, di-n-octyl maleate or fumarate, di(2-ethylhexyl) maleate or fumarate, di-n-nonyl maleate or fumarate, di-n-decyl maleate or fumarate, di-n-undecyl maleate or fumarate, dilauryl maleate or fumarate, dimyristyl maleate or fumarate, dipalmitoyl maleate, or fumarate, di-stearyl maleate or fumarate, and diphenyl maleate or fumarate.

Further possible monomers e) are monomers with N-functional groups that are different from N-alkylol groups. These monomers e) include, for example, (meth)acrylamide, allylcarbamate, acrylonitrile, methacrylonitrile, acrylamidoglycolic acid, acrylamidomethoxyacetic acid methyl ester, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide, N-benzyl(meth)acrylamide, p-hydroxyphenyl(meth)-acrylamide, N-(3-hydroxy-2,2-dimethylpropyl)methacrylamide, ethylimidazolidone (meth) acrylate, N-(meth)acryloyloxyethylimidazolidin-1-one, N-(2-methacrylamido-ethyl)imidazolin-2-one, N-[(3-allyloxy-2-hydroxypropyl)aminoethyl]-imidazolin-2-one, N-vinylformamide, N-vinylpyrrolidone or N-vinylethyleneurea.

The monomers (a) to (e) are generally selected so that the resultant copolymer has a glass transition temperature in the range from 0° C. to +50° C., preferably from +5° C. to +40° C., most preferably from +20° C. to +30° C. Glass transition temperatures are determined for the purposes of the present description by means of differential scanning calorimetry (DSC) according to DIN 53765. For this purpose, the sample is dried at 130° C. for 1 hour, cooled and then heated at a rate of 10 K/minute.

The aqueous copolymer dispersion described herein is produced by free radical emulsion polymerization of the monomer mixture described above in an aqueous medium and normally in the presence of a free radical initiator. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within a redox systems, using transition metal salts, such as iron(II) salts, or other reducing agents. Alkali metal salts of oxymethanesulfinic acid, mercaptans of chain length $C_{10}$-C14, but-1-en-3-ol, hydroxylamine salts, sodium dialkyldithiocarbamate, sodium bisulfite, ammonium bisulfite, sodium dithionite, diisopropyl xanthogen disulfide, ascorbic acid, tartaric acid, isoascorbic acid, boric acid, urea and formic acid can also be used as reducing agents or regulators.

However, water-soluble persulfates, in particular ammonium persulfate or sodium persulfate, are preferably used for initiating polymerization.

Any chain-transfer reagent properly chosen from among the known substances can likewise be used in the polymerization. Examples of these are, inter alia, alcohols, such as methanol, ethanol, propanol and butenol, aldehydes and ketones, such as acetone, methyl ethyl ketone, cyclohexane, acetophenone, acetaldehyde, propionaldehyde, n-butylaldehyde, furfural and benzaldehyde, and mercaptans, such as dodecyl mercaptan, lauryl mercaptan, normal mercaptan, thioglycolic acid, octyl thioglycolate and thioglycerol. Such chain-transfer reagents can be used alone or in the form of a combination of two or more thereof.

Protective colloid and/or emulsifiers used for stabilization of polymer dispersions can likewise either be initially introduced completely at the beginning of the polymerization or partly initially introduced and partly metered or completely metered during the polymerization. The polymerization temperature is typically in the range from 20 to 120° C., such as in the range from 30 to 110° C., for example in the range from 45 to 95° C.

After the end of the polymerization, a further, preferably chemical after treatment, in particular with redox catalysts, such as, for example, combinations of the abovementioned oxidizing agents and reducing agents, can follow for demonomerization. Furthermore, residual monomer present can be removed in a known manner, for example by physical demonomerization, i.e. removed by distillation (in particular via steam distillation) or by stripping with an inert gas. A combination of physical and chemical methods which permits a reduction of the residual monomers to very low contents (<1000 ppm, preferably <100 ppm) is particularly efficient.

In addition to water and the copolymer, the dispersion used as a binder in the coating compositions described herein is stabilized by emulsifiers and optionally in addition with small amounts of protective colloids. These may already be present during the emulsion polymerization or may be added thereafter. The protective colloids are polymeric compounds, for example having molecular weights greater than 2000 g/mol, whereas the emulsifiers are low molecular weight compounds whose relative molecular weights are, for example, below 2000 g/mol. These compounds are preferably added prior and/or during the polymerization itself or can optionally also be subsequently added after the polymerization.

Examples of protective colloids are starch, gum arabic, alginates or tragacanth, methyl-, ethyl-, hydroxyethyl- or carboxymethylcellulose or starch modified by means of saturated acids or epoxides, and synthetic substances, such as polyvinyl alcohol (with or without residual acetyl content) or partly esterified or acetalated polyvinyl alcohol or polyvinyl alcohol etherified with saturated radicals, and polypeptides, such as gelatin, but also polyvinylpyrrolidone, polyvinylmethylacetamide or poly(meth)acrylic acid. Polyvinyl alcohol is preferred.

The proportion by weight of such optionally present protective colloids, based on the total amount of the monomers used, is up to 3% by weight, preferably below 2% by weight.

In the preparation of the present dispersions, nonionic and/or anionic emulsifiers may be used. The amount of these ingredients in general is between 0.5 and 8% by weight, based on the total amount of monomers, preferably between 1 and 5% by weight.

Suitable nonionic emulsifiers are araliphatic and aliphatic nonionic emulsifiers, such as, for example, ethoxylated mono-, di- and trialkylphenols (degree of ethoxylation: 3 to 50, alkyl radical: $C_4$ to $C_9$), ethoxylates of long-chain alcohols (degree of ethoxylation: 3 to 50, alkyl radical: $C_8$ to $C_{36}$) and polyethylene oxide/polypropylene oxide block copolymers. Ethoxylates of long-chain alkanols (alkyl radical: $C_{10}$ to $C_{22}$, average degree of ethoxylation: 3 to 50) are preferably used and among these those based on native alcohols, Guerbet alcohols or oxo alcohols having a linear or branched $C_{12}$-$C_{18}$-alkyl radical and a degree of ethoxylation of 8 to 50 are particularly preferably used.

Further suitable emulsifiers are described in Houben-Weyl, Methoden der organischen Chemie [Methods of Organic Chemistry], volume XIV/1, Makromolekulare Stoffe [Macromolecular substances], Georg-Thieme-Verlag, Stuttgart, 1961, pages 192-208).

Suitable anionic emulsifiers are alkali metal and ammonium salts of alkyl sulfates (alkyl radical: $C_8$ to $C_{18}$), alkyl phosphonates (alkyl radical: $C_8$ to $C_{18}$), of sulfuric acid monoesters and phosphoric acid mono- and diesters of ethoxylated alkanols (degree of ethoxylation: 2 to 50, alkyl radical: $C_8$ to $C_{22}$) and of ethoxylated alkylphenols (degree of ethoxylation: 3 to 50, alkyl radical: $C_4$ to $C_9$), of alkanesulfonic acids (alkyl radical: $C_{12}$ to $C_{18}$), of alkylarylsulfonic acids (alkyl radical: $C_8$ to $C_{18}$), of sulfosuccinic acid monoesters and sulfosuccinic acid diesters of alkanols (alkyl radical: $C_8$ to $C_{22}$) and ethoxylated alkanols (degree of ethoxylation: 2 to 50, alkyl radical: $C_8$ to $C_{22}$) and non-ethoxylated and ethoxylated alkylphenols (degree of ethoxylation: 3 to 50, alkyl radical: $C_4$ to $C_9$). As a rule, the emulsifiers mentioned are used as industrial mixtures, the data on length of alkyl radical and EQ chain being based on the respective maximum of the distributionsoccurring in the mixtures. Examples from said emulsifier classes are Texapon® K12 (sodium laurylsulfate from Cognis), Emulsogen® EP ($C_{13}$-$C_{17}$-alkanesulfonate from Clariant), Maranil® A 25 IS (sodium n-alkyl-($C_{10}$-$C_{13}$) benzenesulfoflate from Cognis), Genapol® liquid ZRO (sodium $C_{12}$/$C_{14}$-alkyl ether sulfate having 3 EO units from Clariant), Hostapal® BVQ-4 (sodium salt of a nonylphenol ether sulfate having 4 EO units from Clariant), Aerosol® MA 80 (sodium dihexylsulfosuccinate from Cytec Industries), Aerosol® A-268 (disodium isodecylsulfosuccinate from Cytec Industries) and Aerosol® A-103 (disodium salt of a monoester of sulfosuccinic acid with an ethoxylated nonylphenol from Cytec Industries).

As a rule, mixtures of anionic and nonionic emulsifiers are used, but it is also possible to use anionic and nonionic emulsifiers alone for stabilization of the dispersions.

When used as a binder for a coating composition, the aqueous dispersion described herein typically has a solids content of from 20 to 70% by weight, preferably from 30 to 65% by weight and particularly preferably from 40 to 60% by weight. Moreover, the resulting coating composition will include a variety of other ingredients, known per se, in addition to the present polymeric hinder.

Examples of such additional ingredients include pigments and fillers. In the context, pigments are understood as meaning solids which have a refractive index greater than or equal to 1.75. In the context of this description, fillers are understood as meaning solids which have a refractive index of less than 1.75.

Examples of suitable fillers include alkaline earth metal oxides, alkaline earth metal carbonates and/or silicate fillers, in particular calcium carbonate, mica, feldspar, kaolin, quartz powders and/or particulate quartz fractions and marble powders and/or particulate marble fractions. When used in plasters and renders, the filler generally has an average particle size of at least and preferably greater than 40 µm, whereas when used in a paint, the filler typically has an average particle size of 1 to 40 µm. Such average particle sizes are determined by sieve analysis, mastersizer measurements or similar methods.

Pigments may be any inorganic or organic and may be color-imparting or opaque finely divided solids. Preferred pigments have a mean diameter for the primary particle of less than or equal to 1 µm, preferably from 0.1 to 0.5 µm, determined by sedimentation analysis according to DIN 66115. Examples of inorganic pigments are metal oxides, such as titanium dioxide, iron oxide or zinc oxide, in particular titanium dioxide. Examples of organic pigments are phthalocyanines, in particular phthalocyanine blue, or diaryl pigments, azo pigments or quinacridone pigments.

In addition to fillers and pigments, the present coating compositions optionally may contain further additives customary per se. For example, additives and further constituents which may be used are film formation auxiliaries, such as mineral spirit, Texanol®, TxiB®, butylglycol, hutyldiglycol, butyldipropylene glycol and butyltripropylene glycol; plasticizers, such as dimethyl phthalate, diisobutyl phthalate, diisobutyl adipate, Coasol B® and Plastilit 3060®; wetting agents, such as AMP 90®, TegoWet 280®, Fluowet PE®; thickeners, such as polyacrylates or polyurethanes, such as Borchigel L75® and Tafigel PUR 60; antifoams, e.g. mineral oil or silicone antifoams; UV screening agents, such as Tinuvin 11 30®, subsequently added stabilizing emulsifiers or polymers, such as polyvinyl alcohol or cellulose ether, rheology-modifying auxiliaries, e.g. polyacrylate or polyurethane thickeners, and other additives and auxiliaries as are customary for the formulation of plasters, renders and paints.

Coating compositions can readily be prepared by simple mixing of the intended amounts of the individual components by means of a conventional stirrer or the like.

The resultant coating compositions can be used in the construction sector, namely as plasters and renders or as paints. These compositions are particularly preferably used as plasters, renders, facade paints and roofing tile paints. In one embodiment, the coating composition comprises, in addition to the ingredients referred to above, a copolymer dispersion comprising a polyacrylate and/or a polymethacrylate. A polyacrylate or a polymethacrylate is a copolymer comprising at least 50 weight %, referring to total monomers, of one or more units derived from acrylate monomers or derived from methacrylate monomers.

The invention will now be more particularly described with reference to the following non-limiting Examples. In the Examples, all parts and percentages are based on weight, unless noted otherwise. All viscosity values cited in the Examples were obtained on a Brookfield Viscometer at 23° C. and 20 rpm using spindle 3 or 4.

EXAMPLE 1

The following procedure was used to prepare a dispersion of a copolymer comprising vinyl acetate/ethylene in a ratio of 91.2/8.8 and also containing 1.5 parts glycidyl methacrylate, 0.93 parts sodium vinylsulphonate and 0.52 parts of itaconic acid (calculated an 100 parts of vinyl acetate+ethylene).

A solution comprising 13.2 g of sodium acetate, 406.6 g of a 20% active solution of Polystep Al 6 (sodium salt of alkylbenzene sulphonate); 161.9 g of a 30% active solution of sodium vinylsulphonate, 0.11 g of Mohr's salt, 1.05 g of Brüggolite FF6 and 0.63 g of Agitan 282 in 2745 g of deionised water was added to a 10-liter pressure reactor equipped with an agitator, heating jacket, dosage pumps and a mass flow meter. The reactor was sealed, evacuated twice and purged twice with nitrogen.

12.5% of a monomer mixture comprising 4784.6 g of vinyl acetate and 78.7 g of glycidyl methacrylate was pumped to the reactor. Ethylene was added to a pressure of 15 bar. The reactor was heated to 54° C. and ethylene added until all of the ethylene (461.7 g) was in the reactor, or the pressure reached 50 bar. If the pressure reached 50 bar before all of the ethylene was added, the remainder was added after the start of reaction.

The temperature was increased to 55° C., at which point a solution comprising 12.1 g of Brüggolite FF6 in 236.1 g of deionised water (reducer) and a solution comprising 12.1 g of sodium persulphate dissolved in 236.1 g of deionised water (oxidizer) were gradually added to the reactor over a period of 300 minutes. The reaction temperature was adjusted to 72° C. and then the remainder of the monomer mixture of vinyl acetate and glycidyl methacrylate and a solution of 27.3 g of itaconic acid dissolved in 367.2 g of deionised water were gradually added to the reactor over a period of 240 minutes. After the addition of the monomer mixture and itaconic acid solution was complete, the temperature was maintained at 72° C. until the addition of the reducer and oxidizer solutions was complete.

The reactor contents were cooled to 65° C., transferred to a stripper vessel under vacuum, then cooled to 50° C. and 0.3 g of Agitan 282 in 5 g of deionised water was added. Then solutions comprising 4.6 g of Bruggolite FF6 in 57.5 g of deionised water and 5.15 g of 70% active t-butylhydroperoxide in 38.2 g of deionised water were dosed in parallel over 15 minutes. The vessel was stirred for a further 30 minutes at 50° C., then cooled to room temperature. The next day the vessel contents were discharged, neutralized to a pH of approximately 7 and filtered. The resulting dispersion contained 55.1% solids and had a viscosity of 260 mPa·s and a pH of 7.0.

EXAMPLE 2

The procedure of Example 1 was followed except that the ratio of vinyl acetate/ethylene was 90/10. The resulting dispersion had 54.8% solids, a viscosity of 320 mPa·s and a pH of 7.4.

EXAMPLE 3

The procedure of Example 1 was followed, except that the 0.52 parts of itaconic acid was replaced by 0.58 parts of acrylic acid, and the dispersion was not neutralized to pH 7. The resulting dispersion had 55.2% solids, a viscosity of 450 mPa·s and a pH of 5.0.

EXAMPLE 4

The procedure of Example 3 was followed except that the ratio of vinyl acetate/ethylene was 90/10. The resulting dispersion had 55.6 solids, a viscosity of 470 mPa·s and a pH of 5.0.

EXAMPLE 5

The procedure of Example 1 was followed, except that the 0.52 parts of itaconic acid was replaced by 1.15 parts of monoethylmaleate, and the dispersion was not neutralized to pH 7. The resulting dispersion had 56.7% solids, a viscosity of 580 mPa·s and a pH of 5.1.

EXAMPLE 6

The procedure of Example 1 was followed, except that the 0.52 parts of itaconic acid was replaced by 1.15 parts of 2-carboxyethylacrylate, and the dispersion was not neutralized to pH 7. The resulting dispersion had 54.6% solids, viscosity of 960 mPa·s and a pH of 4.9.

EXAMPLE 7

The procedure of Example 6 was followed except that the ratio of vinyl acetate/ethylene was 90/10. The resulting dispersion had 54.3% solids, a viscosity of 600 mPa·s and a pH of 4.9.

EXAMPLE 8

The procedure of Example 1 was followed except that no itaconic acid solution was dosed and the dispersion was not neutralized to pH 7. The resulting dispersion had 56.9% solids, a viscosity of 540 mPa·s and a pH of 5.0.

EXAMPLE 9

The following procedure was used to prepare a dispersion of a copolymer comprising vinyl acetate/ethylene in a ratio of 91.2/8.8 and also containing 1.5 parts glycidyl methacrylate, 0.93 parts sodium vinylsulphonate and 0.52 parts of itaconic acid (calculated on 100 parts of vinyl acetate+ethylene) with a preemulsified monomer feed.

A solution comprising 13.2 g of sodium acetate, 251.3 g of a 20% active solution of Polystep A16, 161.9 g of a 30% active solution of sodium vinylsulphonate, 0.11 g of Mohr's salt, 1.05 g of Brüggolite FF6 and 0.31 g of Agitan 282 in 2745 g of deionised water was added to a 10-liter pressure reactor equipped with an agitator, heating jacket, dosage pumps and a mass flow meter. The reactor was sealed, evacuated twice and purged twice with nitrogen.

1435.4 g of vinyl acetate was pumped into the reactor and 461.7 g of ethylene was metered to the reactor. The reactor was heated to 60° C.

In parallel, a solution comprising 27.3 g of itaconic acid, 155.5 g of a 20% active solution of Polystep A16 and 0.63 g of Agitan 282 in 1021.3 g of deionised water was prepared. This solution was mixed with a monomer mixture comprising 3349.2 g of vinyl acetate and 78.7 g of glycidyl methacrylate to form a pre-emulsion.

With the reactor at 60° C., a solution comprising 12.1 g of Bruggolite FF6 in 236.1 g of deionised water (reducer) and a solution comprising 12.1 g of sodium persulphate dissolved in 236.1 g of deionised water (oxidizer) were gradually added to the reactor over a period of 300 minutes. When the reactor temperature reached 70° C., the addition of the pre-emulsion was started and was continued over 240 minutes. The reaction temperature was controlled at 72° C. After the addition of the pre-emulsion was complete, the temperature was maintained at 72° C. until the addition of the reducer and oxidizer solution was complete.

The reactor contents were cooled to 60° C., transferred to a stripper vessel under vacuum, then cooled to 50° C. and 1.05 g of Agitan 282 in 10 g of deionised water was added. Then solutions comprising 4.6 g of Brüggolite FF6 in 57.5 g of deionised water and 5.15 g of 70% active t-butylhydroperoxide in 38.2 g of deionised water were dosed in parallel over 15 minutes. The vessel was stirred for a further 30 minutes at 50° C., then cooled to room temperature.

The next day the vessel contents were discharged, neutralized to a pH of approximately 7, and filtered. The resulting dispersion had 52.2% solids, viscosity of 80 mPa·s and a pH of 7.0.

Comparative Example 1

Comparative Example 1 is a commercially available vinyl/acrylic binder, with 55% solids and a mid-point Tg of 19° C. (Ucar 379G from Dow, now Arkema).

Paint Formulation

A paint formulation was made at a volume solids of 34.6% (28.5% pigment volume concentration) according to the following procedure:

First a pigment grind was prepared, then a letdown was prepared.

Grind

| Material Description | Solids | Lbs. | Gal |
|---|---|---|---|
| Water | 0% | 250.00 | 29.96 |
| Propylene Glycol | 0% | 5.00 | 0.58 |
| Natrosol 330 | 100% | 2.00 | 0.17 |
| MIX 2 MINUTES THEN ADD | | | |
| AMP-95 | 0% | 4.50 | 0.57 |
| Tamol 1124 | 50% | 3.00 | 0.30 |
| Carbowet 106 | 100% | 2.00 | 0.25 |
| Acticide BW-20 | 20% | 1.10 | 0.12 |
| CognisA-38 | 100% | 2.50 | 0.31 |
| MIX 3 MINUTES, THEN ADD PIGMENT AT HIGH SPEED | | | |
| Kronos 2310 | 100% | 250.00 | 7.58 |
| Burgess 28 | 100% | 50.00 | 2.30 |
| GRIND 15 MINUTES THEN CHECK HEGMAN | | | |
| HEGMAN GRIND TARGET = 6.5+ | | | |
| SUBTOTAL (PASTE) | | 570.10 | 42.15 |

Letdown

| Material Description | Solids | Lbs. | Gal |
|---|---|---|---|
| ADD TO PASTE IN ORDER UNDER AGITATION | | | |
| Water | 0% | 54.30 | 6.51 |
| Celvolit 1774 | 55% | 425.00 | 47.69 |
| Texanol | 0% | 0.00 | 1.26 |
| ADD POLYPHOBE UNDER GOOD AGITATION TO VORTEX | | | |
| PolyphobeTR-116 | 40% | 6.50 | 0.71 |
| Polyphobe TR-117 | 40% | 12.50 | 1.37 |
| CognisA-38 | 100% | 2.50 | 0.31 |
| MIX FOR 10 MINUTES | | | |
| Total | | 1080.90 | 100.00 |
| Pigment Volume Concentration (PVC) | 28.53% | | |
| Volume Solids (Binder + Pigment) | 34.66%. | | |

The formulation shown is for a binder with solids content of 55%. The amount of binder and water in the letdown were varied depending on the binder solids to maintain the same volume solids for each paint made.

The experimental binders were tested as sole binder, and also in a blend with a commercially available acrylic dispersion (Rhoplex SG-30 originally from Rohm & Haas, now Dow), commonly used in semi-gloss paint formulations at a ratio of 80/20 experimental binder/commercial acrylic. The properties measured were Gloss, paint viscosity (Krebs and ICI), blocking resistance according to ASTM D4946, wet scrub according to ASTM D2486, pH, hiding powder and degree of whiteness for the paints made with the experimental binders alone. For the paints made with the acrylic latex, additionally the wet adhesion, according to a modified version of ASTM D3359, was measured (3 test samples tested by 3 operators; results are the average of 9 measurements). The performance in all tests was compared with that of a commercially available vinyl/acrylic dispersion (UCAR Latex 379G, originally from Dow, now Arkema) (hereinafter Comparative Example 1, Comp. 1).

Table 1 shows the chemical composition of the copolymers used in the paint formulations, while Tables 2 and 3 show the results of testing of the paint formulations.

TABLE 1

| Example | 1 | 2 | 3 | 4 | 5 | 6 | 7 | 8 | 9 |
|---|---|---|---|---|---|---|---|---|---|
| VA/E-ratio | 91.2/8.8 | 90/10 | 91.2/8.8 | 90/10 | 90/10 | 91.2/8.8 | 90/10 | 91.2/8.8 | 91.2/8.8 |
| SVS | 0.93 | 0.93 | 0.93 | 0.93 | 0.93 | 0.93 | 0.93 | 0.93 | 0.93 |
| IA | 0.52 | 0.52 | | | | | | | 0.52 |
| AA | | | 0.58 | 0.58 | | | | | |
| β-CEA | | | | | | 1.15 | 1.15 | | |
| MEM | | | | | 1.15 | | | | |
| GMA | 1.50 | 1.50 | 1.50 | 1.50 | 1.50 | 1.50 | 1.50 | 1.50 | 1.50 |

SVS = sodium vinylsulfonate;
IA = itaconic acid:
AA = acrylic acid;
β-CEA = 2-carboxyethylacrylate
MEM = monoethylmaleate;
GMA = glycidyl methacrylate

TABLE 2

| Example | 1 | 2 | 3 | 4 | 5 | 6 | 7 | 9 | Comp. 1 |
|---|---|---|---|---|---|---|---|---|---|
| Standalone | | | | | | | | | |
| Stormer Viscosity | 100 | 104 | 126 | 109 | 105 | 116 | 106 | 103 | 110 |
| ICI Viscocity | 1.5 | 1.4 | 2.0 | 1.5 | 1.5 | 1.7 | 1.5 | 1.4 | 1.5 |
| Gloss 60° | 68.8 | 69.9 | 70.0 | 71.7 | 67.4 | 68.6 | 68.9 | 65.8 | 71.0 |
| Scrub Resistance | 1595 | 2370 | 1100 | 1610 | 1115 | 955 | 1380 | 2300 | 1155 |
| Blocking[1] resistance | 5.5 | 4.0 | 4.5 | 3.0 | 4.0 | 5.0 | 3.5 | 6.5 | 3.5 |
| Blocking[2] resistance | 0.0 | 0.0 | 0.0 | 0.0 | 1.5 | 0.0 | 0.0 | 2.0 | 0.0 |
| Blend | | | | | | | | | |
| Stormer Viscosity | 108 | 110 | 110 | 113 | 118 | 111 | 113 | 119 | 121 |

TABLE 2-continued

| Example | 1 | 2 | 3 | 4 | 5 | 6 | 7 | 9 | Comp. 1 |
|---|---|---|---|---|---|---|---|---|---|
| ICI Viscosity | 1.4 | 1.4 | 1.4 | 1.5 | 1.7 | 1.4 | 1.5 | 1.7 | 1.7 |
| Gloss 60° | 72.7 | 74.9 | 73.1 | 73.2 | 73.8 | 72.0 | 72.1 | 70.0 | 71.6 |
| Dry Adhesion | 0.3 | 0.7 | 1.0 | 1.0 | 0.7 | 1.0 | 0.0 | 2.0 | 2.3 |
| Wet Adhesion | 1.3 | 1.0 | 3.3 | 3.3 | 1.0 | 3.0 | 1.0 | 2.7 | 1.3 |
| Scrub Resistance | 570 | 675 | 598 | 770 | 695 | 608 | 635 | 645 | 573 |
| Blocking[1] resistance | 8.0 | 7.0 | 7.0 | 8.0 | 6.5 | 6.5 | 4.5 | 8.5 | 6.0 |
| Blocking[2] resistance | 5.0 | 4.5 | 4.0 | 4.0 | 4.5 | 5.0 | 4.5 | 6.0 | 3.5 |

[1] Blocking resistance 7d, 1 kg, 18 hr, room temperature
[2] Blocking resistance 7d, 1 kg, 30 min, 50° C.

TABLE 3

| Example | 8 | 8 | Comp 1 |
|---|---|---|---|
| Standalone | | | |
| Stormer Viscosity | 114 | 104 | 112 |
| ICI Viscocity | 1.5 | 1.6 | 1.5 |
| Gloss 60° | 72.2 | 64.5 | 70.0 |
| Scrub Resistance | 2675 | 1580 | 1538 |
| Blocking resistance | 0.8 | 4.0 | 2.5 |
| Blocking resistance | 0.9 | 0.0 | 0.1 |
| Blend | | | |
| Stormer Viscosity | 122 | 114 | 121 |
| ICI Viscosity | 1.6 | 1.4 | 1.7 |
| Gloss 60° | 70.2 | 72.3 | 70.1 |
| Dry Adhesion | 2.3 | 4.0 | 2.0 |
| Wet Adhesion | 5.0 | 5.0 | 3.7 |
| Scrub Resistance | 860 | 683 | 688 |
| Blocking [1] resistance | 6.3 | 7.8 | 3.6 |
| Blocking [2] resistance | 4.5 | 5.6 | 0.8 |

[1] Blocking resistance 7d, 1 kg, 18 hr, room temperature
[2] Blocking resistance 7d, 1 kg, 30 min, 50° C.

The invention claimed is:

1. A copolymer dispersion comprising a copolymer which is derived from a monomer mixture comprising:
   a) 88.5 to 94% by weight of at least one vinyl ester of a saturated carboxylic acid;
   b) 5 to 10.5% by weight of ethylene;
   c) 0.5 to 5% by weight of at least one ethylenically unsaturated acid and/or an anhydride thereof and/or a salt thereof; and
   d) 0.5 to 5% by weight of at least one ethylenically unsaturated monomer having at least one crosslinkable functional unit,
   wherein the weight ratio of vinyl ester units to ethylene units in the copolymer is between 89:11 and 94:6, referring to the total amount of these units, the dispersion is stabilized with at least 1% by weight of an emulsifier, and the amounts of monomers and emulsifier refer to the total amount of monomers in the copolymer.

2. The copolymer dispersion of claim 1, wherein the vinyl ester of a saturated carboxylic acid is vinyl acetate.

3. The copolymer dispersion of claim 1, wherein the ethylene is present in an amount between 7 and 10% by weight of the total amount of monomers in the copolymer.

4. The copolymer dispersion of claim 1, wherein the ethylenically unsaturated acid is selected from the group consisting of an ethylenically unsaturated sulfonic acid, an ethylenically unsaturated monocarboxylic acid, a carboxy-group containing ester of an ethylenically unsaturated monocarboxylic acid, or a monoester of an ethylenically unsaturated dicarboxylic acid or a combination of two or more thereof.

5. The copolymer dispersion of claim 1, wherein the ethylenically unsaturated acid is selected from the group consisting of vinyl sulfonic acid, acrylic acid, methacrylic acid, 2-carboxyalkylacrylate, 2-carboxyalkylmethacrylate, itaconic acid, monoalkylester of maleic acid or a combination of two or more thereof.

6. The copolymer dispersion of claim 1, wherein the ethylenically unsaturated monomer having at least one crosslinkable functional unit comprises an ethylenically unsaturated monomer having at least one amide-, epoxy-, hydroxy-, N-methylol-, silane- or carbonyl-group.

7. The copolymer dispersion of claim 6, wherein the monomer mixture comprises an ethylenically unsaturated monomer having an epoxy group.

8. The copolymer dispersion of claim 7, wherein the ethylenically unsaturated monomer having an epoxy group is glycidyl acrylate or glycidyl methacrylate.

9. The copolymer dispersion of claim 1, wherein the monomer mixture further comprises up to 10% by weight of units derived from at least one ethylenically unsaturated monomer (e) which differs from the monomers of groups a) to d).

10. The copolymer dispersion of claim 1, wherein the copolymer has a glass transition temperature between +20° C. and +30° C.

11. The copolymer dispersion of claim 1 and further comprising up to 3% by weight of a protective colloid based on the total amount of monomers in the copolymer.

12. The copolymer dispersion of claim 1 and further comprising at least one anionic emulsifier which is a half ester of sulfuric acid, sulfonic acid, phosphoric acid or phosphonic acid with a fatty acid alcohol having 6-25 carbon atoms, or with an alkylphenol, or with an alkylbenzyl alcohol, or of an alkoxylated fatty acid alcohol having 6-25 carbon atoms, or of an alkyoxylated alkylphenol, or of an alkoxylated alkylbenzyl alcohol.

13. The copolymer dispersion of claim 12, wherein the anionic emulsifier is a half ester of sulfuric acid with a fatty acid alcohol having 12-18 carbon atoms, or with an alkylbenzyl alcohol having an alkyl group with 10-18 carbon atoms and wherein the copolymer contains units derived from itaconic acid.

14. A coating composition comprising the copolymer dispersion of claim 1.

15. The coating composition of claim 14 and further comprising at least one pigment.

16. The coating composition of claim 14 and further comprising a polymer or copolymer dispersion comprising a polyacrylate and/or a polymethacrylate.

17. A paint comprising the coating composition of claim 14 and further comprising a particulate filler having an average particle size of 1 to 40 μm.

18. A render or plaster comprising the coating composition of claim 14 and further comprising a particulate filler having an average particle size greater than 40 μm.

* * * * *